Nov. 6, 1962 R. E. BRUMBACH 3,062,241
COMPOSITE NYLON TUBE
Filed July 16, 1959

INVENTOR.
ROBERT E. BRUMBACH
BY
Teare, Kramer, Sturges & Fetzer
ATTORNEYS

United States Patent Office 3,062,241
Patented Nov. 6, 1962

3,062,241
COMPOSITE NYLON TUBE
Robert E. Brumbach, Mantua, Ohio, assignor to Samuel Moore & Co., Mantua, Ohio, a corporation of Ohio
Filed July 16, 1959, Ser. No. 827,535
4 Claims. (Cl. 138—125)

This invention relates to a composite tube and, more particularly, to a reinforced plastic tube.

According to the present invention, an improved hose pipe of high strength and durability is obtained by providing a layer, such as by braiding or weaving yarn, filament or strand, or a plurality of strands, composed of certain highly polymeric linear esters characterized by stability to moisture and obtained by esterifying one or more glycols containing from two to ten carbon atoms with terephthalic acid or an ester-forming derivative thereof, onto a pipe, preferably an extruded pipe of nylon, and then coating the exterior of such encased nylon tube or pipe with a sheath of nylon. The hose pipes of the present invention are resistant to ultraviolet light, abrasion, and are unaffected by most organic liquids, water, etc. The products produced in accordance herewith are highly useful for use in connection with hydraulically operated mechanical devices for transmission of fluid under high pressure.

Other objects of the invention will appear as the description proceeds.

To the accomplishment of the foregoing and related ends, then, said invention consists of the means hereinafter fully described and particularly pointed out in the appended claims, the following description and annexed drawing setting forth in detail certain illustrative embodiments of the invention, such disclosed means constituting, however, but a few of the various forms in which the principle of this invention may be employed.

Briefly stated, the present invention contemplates the provision of a composite tube having an inner tube of nylon, preferably extruded nylon. Surrounding the inner nylon tube there is provided at least one layer of poly (alkylene terephthalate) ester as a reinforcing member. In a preferred embodiment there is superimposed upon the reinforcing member a second reinforcing member. The reinforcing member provides close to one hundred percent coverage. The strands or filaments from which such reinforcing member or layer is made are composed of a poly (alkylene terephthalate) ester fiber. One or more of the material strands may be braided under a line tension of from about two to about forty pounds. Surrounding the reinforcing member there is provided an outer sheath of nylon which again is desirably extruded over the reinforcing member. The outer sheath and the inner nylon tube are not in contact with each other, being separated therefrom by the interposition of at least one reinforcing member.

By the term "poly (alkylene terephthalate) ester fiber" is meant the highly polymeric linear ester capable of molecular orientation, as shown by characteristic X-ray pattern, by drawing or rolling. These polyesters are produced by interacting terephthalic acid or an ester-forming derivative thereof with a glycol containing from two to ten carbon atoms. Examples of such glycol are the alkylene glycols such as, for example, ethylene glycol, diethylene glycol, trimethylene glycol, tetramethylene glycol, pentamethylene glycol, hexamethylene glycol, octamethylene glyol, and deamethyene glyol.

Examples of ester-forming derivatives of terephthalic acid are the dimethyl and diethyl esters, and half esters, the acid halides, and the ammonium and amine salts thereof. By interacting terephthalic acid or one of the foregoing terephthalic acid derivatives with one of the foregoing glycols, there may be produced these high molecular weight linear polymeric esters from which filaments may be drawn to produce yarns, filaments and strands useful in forming the reinforcing element or elements of the present invention. Reference may be had to Letters Patent of the United States No. 2,465,319 for full details of terephthalate esters useful in accordance herewith, and the method by which such esters and fibrous materials produced therefrom are made.

The term "nylon" as used herein is in its generic sense for any long-chain synthetic polymeric amides or superpolyamides, which have recurring amide groups as an integral part of the main polymer chain. Essentially, these polyamides are of two types, those which are made from diamines and diacids, and those which are made by the self-condensation of omega-amino acids such as omega-amino undecanoic acid. Normal nylon is made from hexamethylene diamine and adipic acid and may be used in accordance with the present invention. A similar polyamide is made from hexamethylene diamine and sebacic acid. Still another polyamide is made from eta-caprolactam which reacts by self-condensation mechanism as if it were eta-amino caproic acid. Still another variety is obtained from omega-amino undecanoic acid by self-condensation. Reference may be had to Letters Patent of the United States to Carothers 2,130,948 for additional examples of nylons, and to "Polymers and Resins" by Golding, 1959, pp. 314 ff.

Reference may be had to the annexed drawing wherein.

Figure 1:
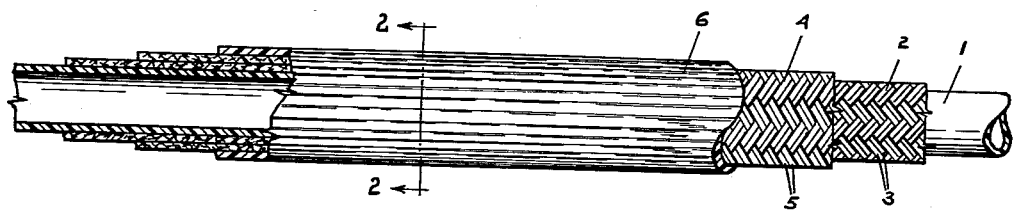
FIG. 1 is a partially cross-sectional view and partially cut-away view of a preferred embodiment of a composite tubular member produced in accordance with the present invention.
Figure 2:
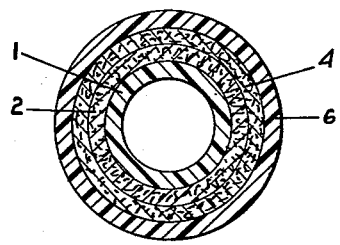
FIG. 2 is a transverse cross-sectional view taken on the line 1—1 of FIG. 1.

Referring more particularly to FIG. 1, there is here shown an inner tube or core tube of nylon 1. Surrounding the core tube 1 is a first braided tubular reinforcing member or sleeve 2 in which a plurality of strands 3 have been machine braided about the core tube 1 using a regular weave, two ends over, two ends under. Superimposed over the first braid is a second reinforcing tubular braid 4 woven in substantially the same manner as the first braid 2. In the example shown in FIG. 1 the second reinforcing member is composed of a pair of strands 5 braided about the first reinforcing member using a regular weave, two ends over, two ends under. The strand material in each case is composed of a poly (alkylene terephthalate) ester fiber, specifically poly (ethylene terephthalate) ester, commonly available as "Dacron." Superimposed over the second reinforcing member 4 is an outer sheath 6 also of nylon, preferably extruded over and covering tightly the reinforcing braided member 4. Although not visible in FIG. 1, it is desirable to compound the nylon used in extruding the outer sheath 6 with a small amount of carbon black which serves to protect the nylon from the deleterious effects of exposure to ultraviolet light. Any other ultraviolet light stabilizer may be used in place of part or all of the carbon black.

A preferred mode of practicing the present invention is conveniently illustrated with the production of a three-eighth inch I.D. hose, it being understood, however, that the principles of the present invention are applicable as well to hydraulic hoses of a wide range of I.D. dimensions. In the production of a highly useful flexible hydraulic hose, the inner core 1 is conveniently produced from a flexibilized, plasticized nylon type 11 material. This material is a self-condensation product of omega-amino-undecanoic acid produced by condensing this acid alone, or in solution in xylene, at a temperature of 250°

C. There is obtained a solid product having a melting point in the range of from 180° to 185° C. and a specific gravity of 1.04. The inner nylon tube is extruded with an I.D. of three-eighths of an inch and a wall thickness of about one-sixteenth of an inch accurately controlled to within about 5 thousandths of an inch tolerance. The extruded nylon tubing is then conducted through a braiding machine fitted with 24 carriers, 12 rotating in one direction and 12 rotating in the opposite direction, one end up—regular weave, two ends over, two ends under. The angle of lay of the first reinforcing tubular member is desirably 41° as shown in FIG. 1. In practice this may vary plus or minus 5°. The tension on the strand may range from 2 to 40 pounds per strand, in the particular case the tension being 5 pounds. The braid is carried out to provide what is known in the trade as "close to one hundred percent coverage" which means that the strands are superimposed over the inner tube to provide as nearly complete coverage as possible, i.e. without leaving any intersticial spaces between successive convolutions, insofar as possible.

After the application of the first braided reinforcing member 2, the tubing is then desirably provided with a second reinforcing tubular member exactly in the same manner as the first reinforcing member with the exception that the angle of lay in this case is decreased to about 33°. This may also vary in practice plus or minus 5°. In some cases it may be desirable to reverse the direction of the respective spool carrier wheels, although this is not essential.

Following the application of the second reinforcing member, the composite tube is then again passed through an extruding die whereby an outer sheath 6 is applied directly over the second reinforcing member. The outer sheath is also desirably type 11 nylon, and preferably the flexibilized, plasticized type. As indicated above, in the preferred embodiment the nylon used in casting the outer sheath 6 contains carbon black dispersed therein for the purpose of rendering the composite tube resistant to the deleterious effects of exposure to ultraviolet light.

The tube may then be cut into suitable lengths and fittings of conventional nature applied to the ends to provide a flexible hydraulic hose.

Where it is desired to maintain fixed dimensions in length and in diameter of the product under a wide range of hydraulic pressures, "Dacron" (poly(ethylene terephthalate)ester) offers the greatest facility because of its low elongation and very minor changes in the presence of moisture. "Dacron" has elongations in terms of ten to twenty percent whereas nylon, for example, will run up to three hundred percent elongation. Nylon is also quite subject to changes in physical properties due to moisture absorption. The angle of braid has considerable effect on both the extension and the increase in diametric measurements, i.e. dimensional stability in use. The angle of lay is selected such that both of these units are kept to a minimum. The angle of lay is generally a compromise and is established by testing. It varies somewhat with type of nylon, wall thickness, nature of braiding material, etc.

With respect to the yarn which is used, either a "thrown" yarn or a "floss type" braid may be employed. It has been found that the floss type braid of Dacron provides a superior coverage and higher strength than the thrown or twisted yarn. Higher burst strengths are secured, this being due, it is believed, to the fact that more of the poly (ethylene terephthalate) ester material can be gotten closer to the surface of the inner tube having the effect of increasing the maximum permissible hoop stress of the product because the strength giving members are then closer to the axis of the tube where it is most effective. It is also believed that the floss type braid will not tend to abrade as rapidly as the thrown yarn in a torsion or flexing condition.

In extruding the outer sheath, it is desirable that there should be considerable penetration of the nylon into the interstices of the second Dacron reinforcing tubular member. This is desirable since upon hardening the projections tend to limit the movement of the braid reducing chaffing of the braid upon its adjacent members and also improves the burst strength under working conditions. Nyon is extruded as a semi-fluid, and it is, therefore, easier to secure the desired degree of penetration and mechanical locking feature of the construction. It should be noted, however, that the penetration of the nylon is insufficient for the outer sheath to contact the inner tubular member.

There has thus been provided a composite tubular member composed of a nylon inner tube, at least one, and preferably two poly (alkylene terephthalate) ester fiber strand braided reinforcing tubular members, and an outer nylon sheath. These composite tubes are particularly useful when fitted with suitable reusable fitting, for example, as hydraulic hoses. They are unaffected by the hydraulic fluid normally employed for these purposes, will withstand torsional stresses more satisfactorily than will wire bound or metal reinforced rubber tubing, and the bursting strengths which are achieved are substantially in excess of the pressures to which devices of this nature are ordinarily subjected.

As an example of the results which have been obtained with products produced in accordance herewith containing one or more reinforcing layers of braided "Dacron," a series of tests were made on tubes, reinforced, unreinforced, sheathed and unsheathed as follows. In all cases, the dimensions of the inner tube (#1 in FIG. 1) were 0.3925 O.D. by 0.3125 I.D. All tests were made in a Tenny Cabinet at 100° F. and a relative humidity of 50%. The liquid pressure at which a blister formed on the wall of the tube or composite burst was recorded.

(I) Inner tube alone:
Sample 1—440 p.s.i.—blister
Sample 2—437 p.s.i.—burst
Sample 3—440 p.s.i.—blister (II) Inner tube plus outer nylon 11 sheath—0.467 O.D.:
Sample 1—900 p.s.i.—burst
Sample 2—900 p.s.i.—blister
Sample 3—870 p.s.i.—burst (III) Inner tube plus single Dacron braider layer:
Sample 1—6000 p.s.i.—burst
Sample 2—6100 p.s.i.—burst
Sample 3—6100 p.s.i.—burst (IV) Inner tube plus two Dacron braided layers:
Sample 1—10,800 p.s.i.—burst
Sample 2—10,600 p.s.i.—burst
Sample 3—10,700 p.s.i.—burst (V) Inner tube plus two Dacron braided layers plus sheath:
Sample 1—10,600 p.s.i.—burst
Sample 2—10,600 p.s.i.—burst (VI) Inner tube plus single Dacron braided layer plus sheath:
Sample 1—6400 p.s.i.—burst
Sample 2—6600 p.s.i.—burst The remarkable improvement in ability to withstand internal pressure in the composite tubes of this invention is demonstrated by the foregoing. It is also of interest to note in Example II the extrusion of a sheath over an unwrapped plastic tube more than doubles its strength even though the added wall thickness is less than one tenth of the original wall thickness.

When the outer sheath is separated from the nylon inner tube by one or more intervening layers of Dacron braided reinforcement, its principal contributions are in respect of dimensional stability and resistance to torsional fatigue. Tests have shown a reduction in elongation of about 50% with the outer sheath over the same device without such outer sheath.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A relatively flexible high strength composite tube comprising, an inner tube of nylon, said inner tube having a relatively small wall thickness as compared to the internal diameter of said inner tube, at least one layer of reinforcing filaments disposed in tensioned relation about said inner tube, said filaments being comprised of a poly (alkylene terephthalate) ester, and an outer sheath of nylon covering said reinforcing filaments, said composite tube possessing dimensional stability and considerable resistance to torsional fatigue.

2. A relatively flexible high strength composite tube comprising, an inner tube of nylon, said inner tube having a relatively small wall thickness as compared to the internal diameter of said inner tube, a first braided tubular reinforcing member disposed in tensioned relation about said inner tube, a second braided tubular reinforcing member disposed in tensioned relation about said first reinforcing member, each of said reinforcing members providing close to one hundred percent coverage and being composed of poly (alkylene terephthalate) ester fiber strands under a line tension of from about 2 to about 40 pounds, and an outer sheath of nylon covering said second reinforcing member, said composite tube possessing dimensional stability and considerable resistance to torsional fatigue.

3. A relatively flexible high strength composite tube comprising, an inner tube of extruded nylon of the self condensation product of omega-amino undecanoic acid having a specific gravity of about 1.04, said inner tube having a relatively small wall thickness as compared to the internal diameter of said inner tube, a first two-strand braided tubular reinforcing member disposed in tensioned relation about said inner tube and having an angle of lay of about 41°, a second two-strand braided tubular reinforcing member disposed in tensioned relation about said first reinforcing member and having an angle of lay of about 33°, each of said reinforcing members being woven two ends over-two ends under, and providing close to 100 percent coverage, the strands of said reinforcing members being composed of poly (ethylene terephthalate) ester fibers, and an outer sheath of extruded nylon of the self condensation product of omega-amino undecanoic acid having a specific gravity of about 1.04 covering said second reinforcing member, said composite tube possessing dimensional stability and considerable resistance to torsional fatigue.

4. A relatively flexible high strength composite tube comprising, an inner tube of extruded nylon, said inner tube having a relatively small wall thickness as compared to the internal diameter of said inner tube, a first braided strand, tubular reinforcing member disposed in tensioned relation about said inner tube, a second braided strand, tubular reinforcing member disposed in tensioned relation about said first reinforcing member, the strands of said reinforcing members being laid in angular relation to the axis of said inner tube, the strands of said first reinforcing member having a greater angle of lay as compared to the angle of lay of the strands of said second reinforcing member, said strands being composed of poly (ethylene terephthalate) ester fibers, and an outer sheath of extruded nylon covering said second reinforcing member, said composite tube possessing dimensional stability and considerable resistance to torsional fatigue, said outer sheath on its interior surface penetrating into interstices between the strands of said second reinforcing member and mechanically locking said second reinforcing member and said outer sheath together.

References Cited in the file of this patent

UNITED STATES PATENTS

| | | |
|---|---|---|
| 2,512,433 | Leben | June 20, 1950 |
| 2,564,602 | Hurst | Aug. 14, 1951 |
| 2,690,769 | Brown | Oct. 5, 1954 |
| 2,728,356 | Brinsmade et al. | Dec. 27, 1955 |
| 2,917,102 | Mahady | Dec. 15, 1959 |
| 2,934,095 | Lockhart | Apr. 26, 1960 |
| 2,962,050 | Ramberg et al. | Nov. 29, 1960 |
| 2,971,538 | Brumbach | Feb. 14, 1961 |
| 2,984,262 | Aymami et al. | May 16, 1961 |
| 3,011,525 | Randle et al. | Dec. 5, 1961 |

Notice of Adverse Decision in Interference

In Interference No. 93,619 involving Patent No. 3,062,241, R. E. Brumbach, Composite nylon tube, final judgment adverse to the patentee was rendered June 11, 1964, as to claim 1.

[*Official Gazette August 25, 1964.*]